July 4, 1950 R. W. BROWN 2,514,201
EQUIPMENT FOR ATTACHING AIRPLANE
PROPELLER DEICER SHOES
Original Filed June 11, 1941 2 Sheets-Sheet 1
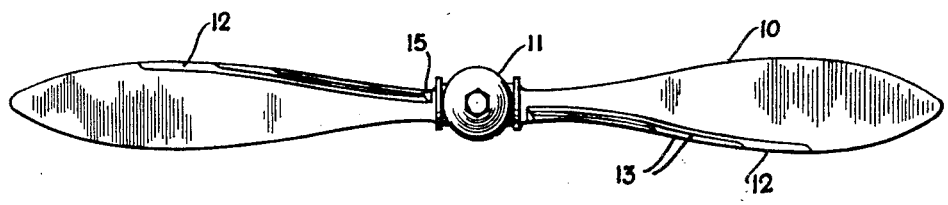
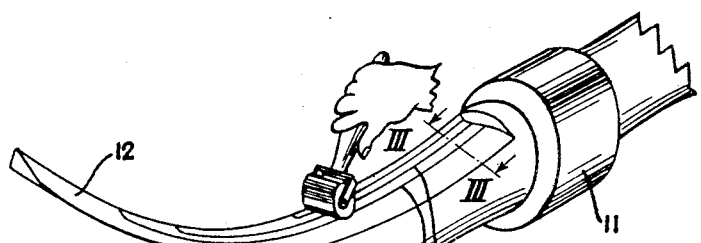
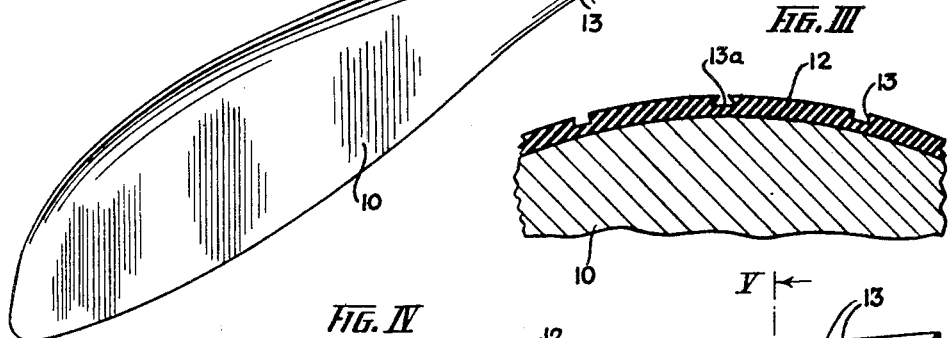
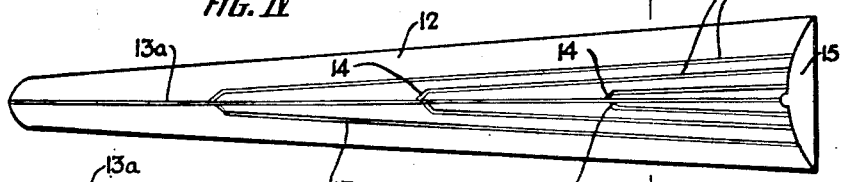
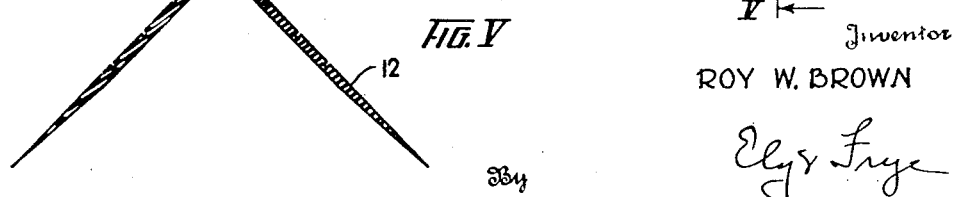
Inventor
ROY W. BROWN
By Ely & Frye
Attorneys July 4, 1950 R. W. BROWN 2,514,201
EQUIPMENT FOR ATTACHING AIRPLANE
PROPELLER DEICER SHOES
Original Filed June 11, 1941 2 Sheets-Sheet 2
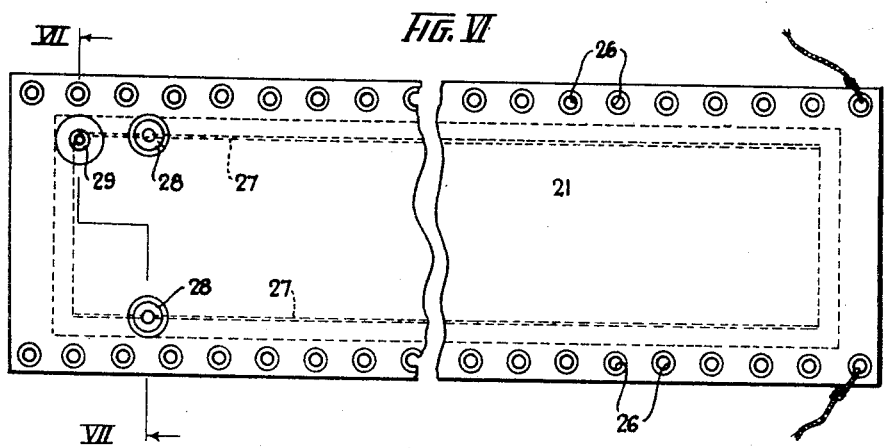
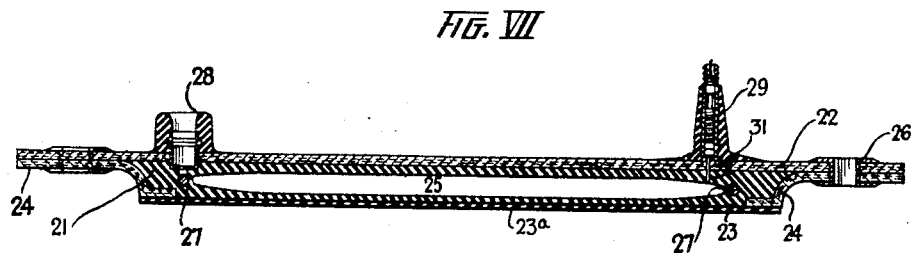
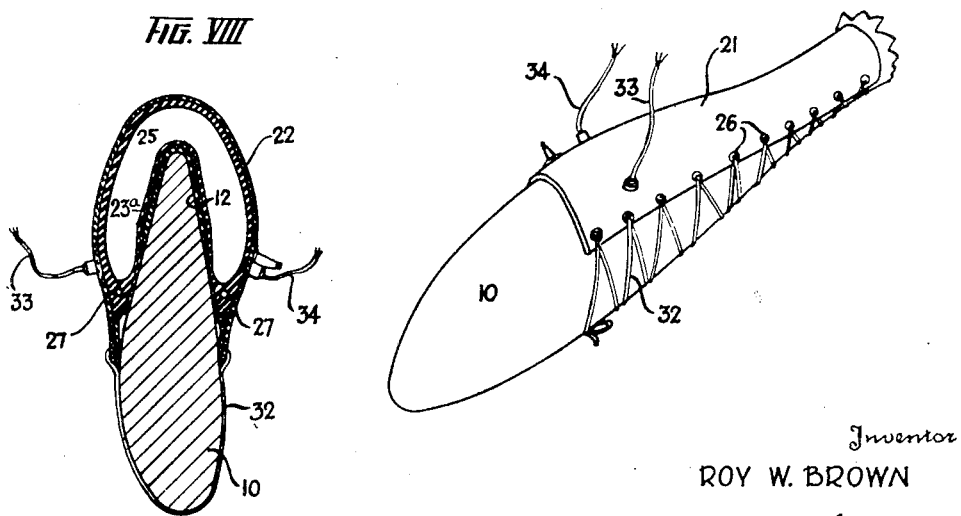
Inventor
ROY W. BROWN Patented July 4, 1950

2,514,201

UNITED STATES PATENT OFFICE 2,514,201

EQUIPMENT FOR ATTACHING AIRPLANE PROPELLER DEICER SHOES

Roy W. Brown, Akron, Ohio, assignor to The Firestone Tire & Rubber Company, Akron, Ohio, a corporation of Ohio Application June 8, 1945, Serial No. 598,366, which is a division of application Serial No. 397,650, June 11, 1941, now Patent No. 2,381,381, dated August 7, 1945. Divided and this application March 10, 1947, Serial No. 733,567

2 Claims. (Cl. 18—6)

This invention relates to airplane propeller deicers generally, especially to an improved apparatus for attaching a deicer shoe to an airplane propeller blade.

It obviously is necessary to secure very tight and thorough adhesion between the deicer shoe and the propeller blade due to the severe air stresses to which the deicer shoe is subjected, since such pressures would tear the shoe from the propeller unless uniform and complete adhesion is obtained. The adhesion problem involved is complicated by the irregular and varied contours of propellers. Such contoured surfaces are difficult to work with in that it is hard to obtain a uniform pressure when applying the deicer shoe to the propeller.

One problem involved in attaching deicer shoes to airplanes in service is that the propellers usually have to be removed from the airplane before attaching the deicer shoes thereto. As it takes several hours both to remove a propeller from an airplane and to reassemble it, such removal is objectionable and it is highly desirable to secure the deicer shoe to the propeller while same is on the plane.

The general object of the present invention is to provide novel, improved apparatus for assembling a deicer shoe on a propeller.

Further objects of the invention are to provide improved means for securing deicer shoes to airplane propellers even though such propellers are mounted on an airplane.

The foregoing and further objects will be manifest as the specification proceeds, the invention being described with particular reference to the accompanying drawings, in which:

Figure I is an elevation of a propeller having deicer shoes of the invention secured thereto;

Figure II is a fragmentary perspective view of a propeller showing one step in the process of securing the deicer shoe thereto;

Figure III is an enlarged fragmentary sectional view taken on line III—III of Figure II;

Figure IV is a plan of a deicer shoe embodying the invention;

Figure V is a sectional view taken on line V—V of Figure IV;

Figure VI is a plan of pressure apparatus used in securing a deicer shoe to a propeller;

Figure VII is a sectional view taken on line VII—VII of Figure VI;

Figure VIII is a sectional view showing the manner in which the pressure bag of Figure VI is secured to propeller;

Figure IX is a perspective view further illustrating the manner in which the pressure bag is secured to a propeller.

This application is a division of my copending application Serial No. 598,366, filed June 8, 1945, which was a division of my then copending application, Serial No. 397,650, filed June 11, 1941, now Patent No. 2,381,381, issued August 7, 1945.

Referring in detail to Figure I of the drawings, a propeller 10 of standard construction is shown therein. This propeller 10 is carried on a hub 11 which is adapted to be secured to an airplane motor. Deicer shoes, generally indicated 12 are secured to the leading edges of each half of the propeller 10, which shoes 12 are usually formed from rubber, or synthetic rubber, but other rubber-like, or plastic substances may be used, when suitable. The deicer shoes 12 are initially molded so that they are substantially inverted V shape in section, as shown in Figure V to facilitate mounting them on the leading edge of a propeller. The deicer shoes have tapered edges so that they can be secured to a propeller having a desired airfoil contour without materially changing same. Of course, the deicer shoes 12 may be positioned in recessed regions of the propeller 10 but the shoes are so thin that they do not materially interfere with the air flow characteristics of a propeller that has been entirely preformed before securing the deicer shoe thereto.

Figure IV shows a plurality of longitudinally extending grooves 13 formed in the deicer shoe 12 at the base or hub end thereof. One groove 13a is centrally positioned in and extends the length of the deicer shoe while the remaining grooves are formed in corresponding positions on opposite sides of the central groove 13a and converge thereon. The grooves extending less than the entire length of the shoe 12 are connected to the central groove 13a by angularly positioned grooves 14, each of which extends between the end of one of the grooves 13 and the groove 13a. Note that the grooves 14 are so positioned on opposite sides of the groove 13a so as not to intersect the groove 13a at the same place, but so that such points of intersection are offset. The grooves 13 and 14 all have parallel edges or side walls, as initially molded. However, when the deicer shoe is secured to the propeller 10, which has a substantially cylindrical hub portion, the deicer shoe tends to be flattened out in the portion thereof overlying the cylindrical portion of the propeller 10. By such deformation of the inverted V-shaped deicer shoe, the central groove 13a thereof has its side walls deflected inwardly toward each other from the base of the groove so that the walls converge toward their upper edges. The converging walls of the groove 13a adjacent the hub of the propeller greatly facilitate retention of deicer fluid in the groove while still permitting ready radial flow of the fluid. As the propeller progressively becomes blade-like toward its outer ends with the leading edges becoming relatively sharp, it will be seen that the angular shoe applied thereto becomes less obtuse, until a point is reached where the sides of the V-shaped shoe will be drawn toward each other to form an acute angle when the shoe is applied to the propeller as illustrated in Figure II. While the walls of the central groove 13a will converge toward their upper edges at the hub portion of the propeller, it will now be seen that this convergence progressively changes into divergence as the leading edge of the propeller becomes sharper than the V shape of the shoe. A sump, or liquid collecting recess 15 is formed in the hub end of the deicer shoe 12 and in operation suitable means (not shown) are associated with the propeller for depositing deicer fluid into the sump. Centrifugal force then moves the deicer fluid radially through the grooves 13 and 13a so that the deicing action is exerted over the length of the deicer shoe and over the surface of the propeller when the fluid spills out of the groove.

Ordinarily the deicer shoes 12 are best applied to the propeller 10 by cementing them thereto. A rubber cement or other suitable adhesive, which is compounded so as to secure rubber-to-metal adhesion, is applied to the leading edges of the propeller 10, and to the premolded deicer shoe 12, and the latter is applied to the cemented leading edge of the propeller at the hub end thereof and gradually stitched or pressed into engagement with the propeller, as indicated in Figure II. Note that the initial contour of the shoe 12 facilitates its engagement with the propeller. After the deicer shoe 12 is stitched into as tight engagement with the propeller as is possible, the cemented bond is cured under heat and pressure.

To this end a pressure boot 21 is mounted on the propeller, which pressure boot comprises an outer flexible but inextensible layer, usually made from rubberized fabric 22 and an inner layer of electroconductive rubber 23. The edges of the electroconductive rubber 23 are reinforced by rubberized fabric 24 and a layer of non-conducting rubber 23a is applied to the exposed surface of the electroconductive rubber 23 to insulate same. An air tight chamber 25 is formed within boot 21 which chamber extends the length thereof. A plurality of apertured rivets 26 are secured to the longitudinally extending edges of the boot 21 to facilitate securing same to a propeller, or other contoured surface with which it is to be used. The electroconductive rubber 23 has longitudinally extending electric conductors 27 embedded therein, in order to establish a uniform electrical potential within the rubber. Socket means 28 are connected to each of the conductors 27 at one end thereof and are integrally bonded to the pressure boot 21 whereby a suitable source of electrical energy can be connected to the pressure boot. A valve 29 also is secured to the pressure boot and connects to the chamber 25 through a conduit 31 formed in the pressure boot. In use of the pressure boot 21, a cord 32, or other desired element, is threaded through the rivets 26 in the opposite edges of the pressure boot and then the cord 32 is tightened in order to secure the flexible pressure boot to the irregular and varied contour of the propeller. After the pressure boot is laced into tight engagement with the propeller, chamber 25 is inflated as shown in Figure VIII in order to force the confronting surface of the boot tightly and uniformly against the deicer shoe 12 and force the latter tightly against the propeller. Then suitable electric conductors 33 and 34 are connected to the sockets 28 and electric current is passed through the electroconductive rubber 23, which is compounded in any suitable manner to facilitate passage of current thereto. This flow of electricity through the rubber heats same to a relatively high temperature, such as 90° to 100° C. and this heat, adjacent with the deicer shoe 12, acts to dry, polymerize, cure and/or vulcanize the adhesive applied to the propeller to secure a permanent bond between the deicer shoe and the propeller.

By practice of the invention a deicer shoe can be secured to an airplane propeller, when it is on a plane, in a much shorter time than by the previous practice. Prior methods and apparatus also required removing the propeller from the plane. It will be apparent that the varied contour of a propeller makes it difficult to secure a deicer shoe thereto but that the apparatus disclosed herein overcomes this difficulty.

The present apparatus is small, light weight, and easily handled, so that it can be transported readily and used to secure a deicer shoe to an airplane propeller while the latter is mounted upon an airplane.

The detailed description of the particular embodiments of the invention illustrated and described herein are not to be construed as limiting the invention thereto. The invention includes the features of patentable novelty residing in the foregoing description and accompanying drawings as set forth in the appended claims.

What is claimed is:

1. A vulcanization boot adapted to provide evenly distributed heat and pressure to an irregularly contoured object requiring vulcanization, said boot comprising an outer wall of flexible, non-extensible material and an inner wall of electrically conductive rubber, said outer and inner walls being marginally bonded to define a fluid-retaining chamber therebetween, valve means associated with said outer wall and communicating with said chamber for the introduction of fluid under pressure to said chamber, electrical conduit means associated with said electrically conductive inner wall for the introduction and flow of electric heating current therethrough, and means associated with opposite margins of said boot to maintain said inner wall in snug clamped engagement with an irregularly contoured object requiring vulcanization.

2. A vulcanization boot for use on propellers said boot comprising an elongate envelope including an outer wall of rubberized fabric and an inner wall of electrically conductive rubber-like material, said outer and inner walls being marginally bonded to define a pneumatic pressure chamber therebetween, valve means associated with said outer wall and communicating with said chamber for the introduction of pneumatic pressure to said chamber, electric conduits embedded along opposite margins of said electrically conductive inner wall for the introduction of heating current in a manner to effect flow thereof through the area intermediate said conduits, and means comprising a plurality of lacing eyes disposed along opposite margins of said boot to permit pressure application of the inner wall of said boot to an irregularly contoured object.

ROY W. BROWN.

REFERENCES CITED

The following references are of record in the file of this patent:

UNITED STATES PATENTS

| Number | Name | Date |
|---|---|---|
| 1,911,894 | Heintz | May 30, 1933 |
| 1,923,736 | Lewis et al. | Aug. 22, 1933 |
| 1,963,871 | Semler | June 19, 1934 |
| 2,204,617 | Peel et al. | June 18, 1940 |
| 2,341,360 | Bulgin | Feb. 8, 1944 |
| 2,438,952 | Te Grotenhuis | Apr. 6, 1948 |

FOREIGN PATENTS

| Number | Country | Date |
|---|---|---|
| 572,979 | Germany | Mar. 24, 1933 |